United States Patent
Schwager et al.

(10) Patent No.: US 9,225,558 B2
(45) Date of Patent: Dec. 29, 2015

(54) METHOD FOR RECEIVING A SIGNAL, WHICH IS TRANSMITTED OVER A PAIR OF WIRES AND RECEIVER

(75) Inventors: Andreas Schwager, Kernen (DE); Stephen Tiedemann, Stuttgart (DE); Dietmar Schill, Winnenden (DE)

(73) Assignee: SONY Deutschland GmbH, Berlin (DE)

( * ) Notice: Subject to any disclaimer, the term of this patent is extended or adjusted under 35 U.S.C. 154(b) by 1931 days.

(21) Appl. No.: 11/680,901

(22) Filed: Mar. 1, 2007

(65) Prior Publication Data

US 2007/0268989 A1    Nov. 22, 2007

(30) Foreign Application Priority Data

May 19, 2006    (EP) ..................................... 06010435

(51) Int. Cl.
 *H04M 1/00*    (2006.01)
 *H04L 25/02*    (2006.01)
 (Continued)

(52) U.S. Cl.
 CPC .............. *H04L 25/0272* (2013.01); *H04B 3/30* (2013.01); *H04B 3/46* (2013.01); *H04L 1/02* (2013.01); *H04L 25/085* (2013.01); *H04L 25/10* (2013.01)

(58) Field of Classification Search
 CPC ....... G06F 1/10; G06F 13/4072; G06F 1/266; H02M 1/44; H02M 1/12; H02M 2001/123; H02M 2001/0009; G01R 27/28; G01R 19/10; H04M 1/6033; H04M 9/085; H04M 3/005; H04M 9/082; H03H 7/427; H03H 9/6483; H04B 1/582; H04B 3/32; H04B 1/123

USPC ........ 375/285, 349; 379/387.01, 388.06, 398, 379/399.01, 403, 406.01
See application file for complete search history.

(56) References Cited

U.S. PATENT DOCUMENTS 4,381,457 A * 4/1983 Wiles ........................ G03F 1/30
 307/64
4,849,685 A * 7/1989 Nave ............................. 324/613
(Continued)

FOREIGN PATENT DOCUMENTS

JP    52-022806    2/1977
JP    52-058306    5/1977
(Continued)

OTHER PUBLICATIONS

Ian P. MacFarlane, "A Probe for the Measurement of Electrical Unbalance of Networks and Devices", IEEE Transactions on Electromagnetic Compatibility, vol. 41, No. 1, Feb. 1999, pp. 3-14.

(Continued)

*Primary Examiner* — Akelaw Teshale
(74) *Attorney, Agent, or Firm* — Oblon, McClelland, Maier & Neustadt, L.L.P.

(57) ABSTRACT

A method for receiving a signal, which is transmitted over a pair of wires is measuring a differential mode (DM) signal and is measuring a common mode (DM) signal and using both DM and CM to restore the original signal. A corresponding receiver (1) comprises a CM receiving path (3), a DM receiving path (2) and a digital signal processor (22) to combine CM and DM signals. With this method and receiver (1) the coverage of networks, which are slightly unbalanced, can be enhanced, especially in cases where the CM signal is less attenuated than the DM signal.

18 Claims, 2 Drawing Sheets

Figure 1:
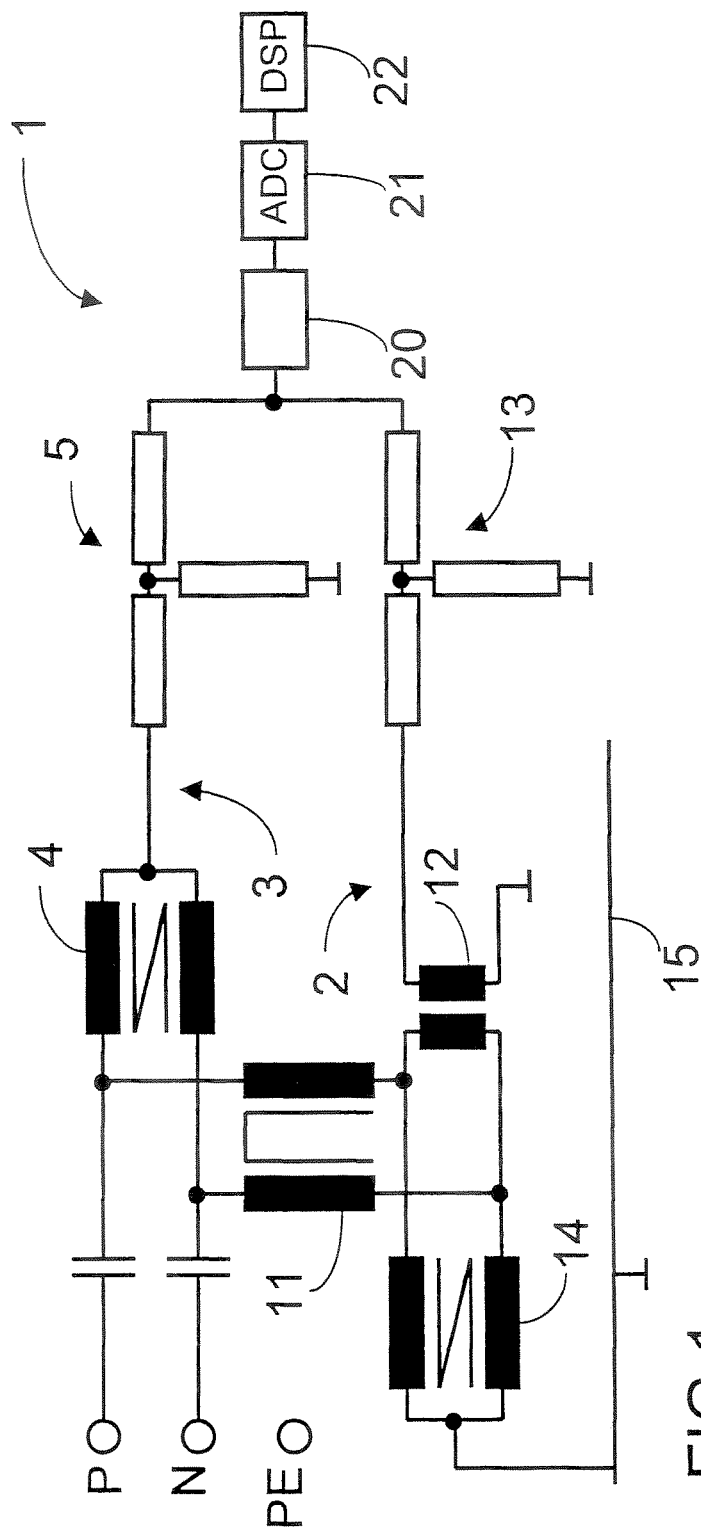

(51) Int. Cl.
*H04B 3/30* (2006.01)
*H04B 3/46* (2015.01)
*H04L 1/02* (2006.01)
*H04L 25/08* (2006.01)
*H04L 25/10* (2006.01)

(56) References Cited

U.S. PATENT DOCUMENTS

| | | | | |
|---|---|---|---|---|
| 5,083,101 | A | * | 1/1992 | Frederick ............... 333/181 |
| 5,793,196 | A | | 8/1998 | White |
| 5,832,032 | A | * | 11/1998 | Overbury ................ 375/285 |
| 5,902,249 | A | * | 5/1999 | Lyster ............. A61B 5/7217 600/509 |
| 5,949,230 | A | * | 9/1999 | Kobayashi et al. ......... 324/72.5 |
| 5,995,566 | A | * | 11/1999 | Rickard et al. ............ 375/346 |
| 6,658,265 | B1 | * | 12/2003 | Steel ................. H03F 3/191 455/552.1 |
| 6,771,142 | B1 | | 8/2004 | Wendt et al. |
| 7,478,029 | B1 | * | 1/2009 | Joffe ........................ 703/15 |
| 7,809,076 | B1 | * | 10/2010 | Ghobrial ......... H04L 25/03885 375/265 |
| 2005/0053227 | A1 | * | 3/2005 | Fortier .................. 379/390.04 |

FOREIGN PATENT DOCUMENTS

| | | |
|---|---|---|
| JP | 07-240652 | 9/1995 |
| JP | 2004-172979 | 6/2004 |
| JP | 2005-065216 | 3/2005 |

OTHER PUBLICATIONS

Japan Office Action issued Oct. 25, 2011 in Japanese Application No. 2007-134452 (with English translation).
U.S. Appl. No. 13/502,774, filed Jun. 11, 2012, Schwager, et al.

* cited by examiner

METHOD FOR RECEIVING A SIGNAL, WHICH IS TRANSMITTED OVER A PAIR OF WIRES AND RECEIVER

The present invention relates to a method for receiving a signal, which is transmitted over a pair of wires and a receiver for wire-based communication signals.

In powerline communication (PLC) systems as well as in digital subscriber line (xDSL)-communication the signals are transmitted and received in a differential mode, preferably. Differential mode (DM) signalling is a method of transmitting information over pairs of wires. Differential mode signalling causes less radiation from the wire than common-mode (CM) signalling. Mostly the two wires are routed in parallel, and sometimes twisted together, so that they show quite a good symmetry. At DM signalling one wire carries the signal and the other wire carries the inverse of the signal, so that the sum of the voltages on the two wires is always assumed to be constant. At the end of the connection the receiving device reads the difference between the two signals. Since the receiver ignores the wires' voltages with respect to ground, small changes in ground potential between transmitter and receiver do not affect the receiver's ability to detect the signal. Also, the system is immune to most types of electrical interference, since any disturbance that lowers the voltage level on one wire will also lower it on the second wire. This system has a lower susceptibility to noise, because distant noise sources tend to add the same amount of voltage (called common-mode noise) to both wires, so the difference between the voltages remains the same. Manufacturers can further reduce noise by twisting the two wires of a pair together, so that the noise induced in one half-twist tends to cancel the noise in the neighboring half-twist.

At in-house powerline grids, as well as in other nominally balanced networks, however, there are asymmetric elements between Phase and Neutral like a light switch, a current bar in the fuse cabinet, branches, etc. At these asymmetric elements, the DM signals injected by PLC modems are converted into CM signals, thereby attenuating the DM signal, which is added to attenuation due to other attenuation effects for the DM signal and thereby reducing the coverage of PLC systems or other nominally balanced networks.

Therefore it is the object of the present invention to provide a method for increasing the coverage of signals in wire-based communication systems and a corresponding receiver.

These objects are solved by the inventive method for receiving a signal, which is transmitted over a pair of wires, according to claim 1 and a receiver for wire-based communication systems according to claim 5. Preferred embodiments thereof are respectively defined in the respective dependent claims.

A method for receiving a signal, which is transmitted over a pair of wires, comprises the steps of measuring a differential mode of the signal, measuring a common mode of the signal and using both the differential mode and the common mode to restore the original signal. Especially in cases where the common mode is less attenuated than the differential mode, this method helps to increase the coverage of the corresponding network, because the signal may be restored with the help of the less attenuated common mode signal, which has not been used so far.

Preferably the differential mode and the common mode are separated before measuring the modes, since both mode measurement can be optimized separately without affecting the measurement of the other mode.

Further, preferably the pure differential mode and the pure common mode are combined together before being input into one common analog-digital-converter and being evaluated afterwards by one common digital signal processor, so that less components are used for receiving the signals.

As an alternative the pure differential mode and the pure common mode are input into distinct analog-digital-converters. With this method two different inputs are realized, thereby reducing effects of one input to the other input.

An inventive receiver for wire-based communication signals is characterized by a differential mode receiving path and a common mode receiving path, which are combined into a digital signal processor. With this scheme both modes can be used in the digital signal processor to restore the original signal.

Preferably, a differential mode choke can be used in the differential mode receiving path to attenuate the common mode and a common mode choke can be used in the common mode receiving path to attenuate the differential mode. Thereby a separation of the differential and the common mode can be achieved.

Further preferably impedance matching networks for the differential mode in the differential mode receiving path and/or for the common mode in the common mode receiving path are used to improve the receiving characteristics of the receiver and to hinder reflections of the respective modes, which would increase disturbances in the network.

Less components may be used, if both the common mode and the differential mode receiving path are coupled to one filter.

A better fitting of filters to the respective modes is achieved by using separate filters for the common mode and the differential mode.

Such a receiver may be used advantageously for receiving PLC signals or xDSL-signals.

However the inventive method and the inventive receiver may be used in any case, where networks, which should be balanced are in reality slightly unbalanced, thereby giving rise to common mode signals, even if only differential mode signals are coupled into the network.

Figure 2:
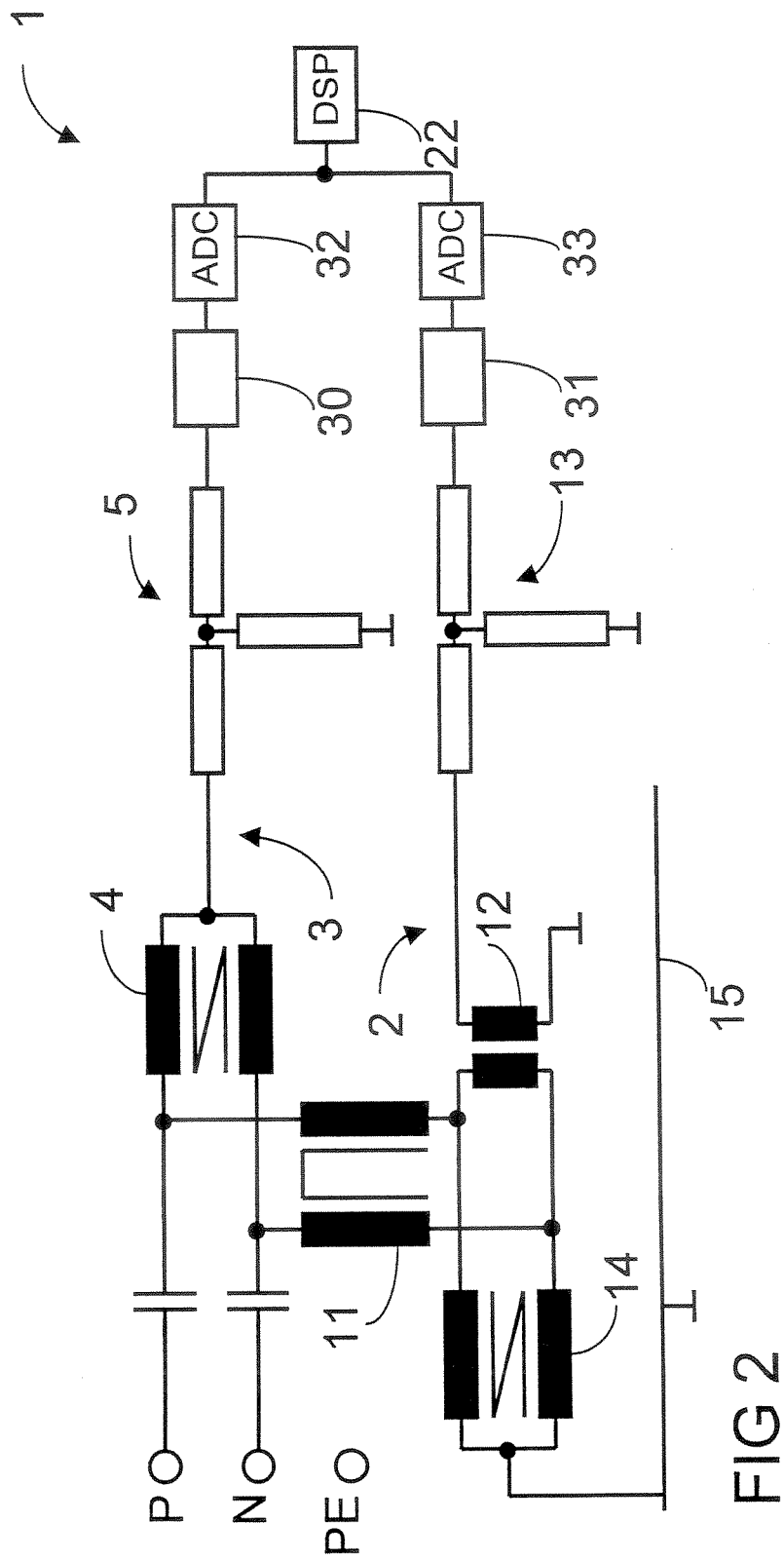

The present invention and its numerous embodiments will be better understood on basis of the following exemplary description thereof taken in conjunction with the accompanying drawing, in which FIG. 1 shows a circuit of a receiver according to a first embodiment of the present invention, and FIG. 2 shows a circuit of a receiver according to a second embodiment of the present invention.

In FIG. 1 a schematic circuit for a receiver 1 is depicted, that is used in a PLC system. However receivers for xDSL-systems or other two-wire, mainly balanced, networks are working on the same basis. In a powerline grid (with Phase P, Neutral N and Ground PE), the signals are normally coupled into the grid as differential mode (DM) via a PLC modem, which acts as a transmitter (not shown). Due to inherent imbalances (light switches, current bars the fuse cabinet, branches, etc.) a part of the original pure DM signal is coupled into the common mode (CM) of the signal. Since the CM signal is more likely to radiate from the wires and cause interference, it has been disregarded so far to inject CM signals, but using the CM signal for receiving only, does not cause radiation.

However, the CM signal can be used to enhance the coverage of the networks (e.g. PLC systems or xDSL-systems). A receiver 1 to receive both the common mode and the differential mode is built of a differential mode receiving path 2 and a common mode receiving path 3.

The common mode receiving path 3 is built of a common mode choke 4 for highly attenuating the DM signals, but not affecting the CM signals and of a CM impedance matching network 5 for hindering reflections of the CM signal to be inputted into the network again.

The differential mode receiving path 2 is built of a differential mode choke 11, for highly attenuating common mode signals and not affecting DM signals, and a balun 12, which block CM signals, whereby DM signals are not affected and a DM impedance matching network 13, which are all connected in series. An additional common mode choke 14 is connected between the balloon 12 and a ground plane 15 in order to build a drain for the common mode signal.

Both the common mode receiving path 3 and the differential mode receiving path 2 are connected in parallel to the powerline gridlines P and N.

In the first embodiment of FIG. 1 both the common mode receiving path 3 and the differential mode receiving path 2 are coupled into one filter 20 and the filtered signal is converted to a digital signal in an analog-digital-converter (ADC, 21). The digitally converted signal is used by a digital signal processing unit (DSP, 23) to restore the original signal.

In the second embodiment of FIG. 2 the CM receiving path 3 and the DM receiving path 2 are coupled to separate filters, namely a CM filter 30 and a DM filter 31, which respective output signals are coupled to separate analog-digital-converters, namely a CM analog-digital-converter 32 and a DM analog-digital-converter 33, thereby giving the possibility to better adapt the CM filter 30 and the DM filter 31 to the CM signal and DM signal, respectively.

Even if the invention is described above with respect to a PLC-system, it is evident that it may be used for every network that is intended to be balanced, but certain inbalances occur, e.g. in xDSL-systems.

If PLC modems are integrated into big devices like a flat display of a personal computer (PC) a counterpoise for CM reception could easily be integrated.

The invention claimed is:

1. A method for receiving a communication signal transmitted over a powerline communication (PLC) system, the method comprising:
   receiving the communication signal over the PLC system;
   measuring a differential mode of the communication signal between a phase line and a neutral line of the PLC system;
   measuring a common mode of the communication signal between the phase line, the neutral line and a ground plane of the PLC system;
   combining the differential mode and the common mode to generate a combined signal;
   performing, by an analog-to-digital converter (ADC), an ADC conversion on the combined signal to generate a combined digital signal; and
   restoring, by a digital signal processor (DSP), the communication signal according to the combined digital signal.

2. The method according to claim 1, further comprising:
   separating the differential mode and the common mode of the communication signal before the measurement of the differential mode and the measurement of the common mode of the communication signal.

3. A receiver that receives a communication signal transmitted over a powerline communication (PLC) system, the receiver comprising:
   a differential mode receiving path connected to a phase line and a neutral line of the PLC system, the differential mode receiving path measuring a differential mode of the communication signal between the phase line and the neutral line;
   a common mode receiving path connected to the phase line, the neutral line and a ground plane of the PLC system, the common mode receiving path measuring a common mode of the communication signal between the phase line, the neural line and the ground plane;
   a filter that combines the differential mode output from the differential mode receiving path and the common mode output from the common mode receiving path to generate a combined signal;
   an analog-to-digital converter (ADC) that converts the combined signal to generate a combined digital signal; and
   a digital signal processor (DSP) that restores the communication signal according to the combined digital signal.

4. The receiver according to claim 3, further comprising:
   a differential mode choke in the differential mode receiving path.

5. The receiver according to claim 4, further comprising:
   a differential mode impedance matching network connected after the differential mode choke in the differential mode receiving path.

6. The receiver according to claim 3, further comprising:
   a common mode choke in the common mode receiving path.

7. The receiver according to claim 6, further comprising:
   a common mode impedance matching network connected after the common mode choke in the common mode receiving path.

8. The receiver according to claim 6, further comprising:
   a differential mode choke connected in the differential mode receiving path after the common mode choke, the differential mode choke for coupling the common mode to ground; and
   a balun connected between the common mode choke and a filter for the differential mode receiving path.

9. The receiver according to claim 3, further comprising:
   a common mode filter in the common mode receiving path; and
   a differential mode filter in the differential mode receiving path.

10. A method for receiving a communication signal transmitted over a powerline communication (PLC) system, the method comprising:
    receiving a communication signal over the PLC system;
    measuring a differential mode of the communication signal between a phase line and a neutral line of the PLC system;
    measuring a common mode of the communication signal between the phase line, the neutral line and a ground plane of the PLC system;
    performing, by a first analog-to-digital converter (ADC), a first ADC conversion on the common mode to generate a digital common mode signal;
    performing, by a second ADC, a second ADC conversion on the differential mode to generate a digital differential mode signal; and
    restoring, by a digital signal processor (DSP), the communication signal according to the digital common mode signal and the digital differential mode signal.

11. The method according to claim 10, further comprising:
    separating the differential mode and the common mode of the communication signal before the measurement of the differential mode and the measurement of the common mode of the communication signal.

12. A receiver that receives a communication signal transmitted over a powerline communication (PLC) system, the receiver comprising:

a differential mode receiving path connected to a phase line and a neutral line of the PLC system, the differential mode receiving path measuring a differential mode of the communication signal between the phase line and the neutral line;

a common mode receiving path connected to the phase line, the neutral line and a ground plane of the PLC system, the common mode receiving path measuring a common mode of the communication signal between the phase line, the neural line and the ground plane;

a first analog-to-digital converter (ADC) connected to the common mode receiving path, the first ADC converting the common mode to generate a digital common mode signal;

a second ADC connected to the differential mode receiving path, the second ADC converting the differential mode to generate a digital differential mode signal; and a digital signal processor (DSP), connected to both the first ADC and the second ADC, the DSP restoring the communication signal according to the digital common mode signal and the digital differential mode signal.

13. The receiver according to claim 12, further comprising:
a differential mode choke in the differential mode receiving path.

14. The receiver according to claim 13, further comprising:
a differential mode impedance matching network connected after the differential mode choke in the differential mode receiving path.

15. The receiver according to claim 12, further comprising:
a common mode choke in the common mode receiving path.

16. The receiver according to claim 15, further comprising:
a common mode impedance matching network connected after the common mode choke in the common mode receiving path.

17. The receiver according to claim 15, further comprising:
a differential mode choke connected in the differential mode receiving path after the common mode choke, the differential mode choke for coupling the common mode to ground; and
a balun connected between the common mode choke and a filter for the differential mode receiving path.

18. The receiver according to claim 12, further comprising:
a common mode filter in the common mode receiving path; and
a differential mode filter in the differential mode receiving path.

* * * * *